(12) United States Patent
Chang et al.

(10) Patent No.: US 7,769,857 B2
(45) Date of Patent: Aug. 3, 2010

(54) SMART CLIENT-SERVER POWER CONTROL APPARATUS

(75) Inventors: Chia-Ming Chang, Taichung County (TW); Ching-Piao Chen, Yilan County (TW); Wen-Kao Hsieh, Hsinchu (TW); Wu-Chi Ho, Hsinchu (TW)

(73) Assignee: Industrial Technology Research Institute, Hsinchu (TW)

( * ) Notice: Subject to any disclaimer, the term of this patent is extended or adjusted under 35 U.S.C. 154(b) by 190 days.

(21) Appl. No.: 12/046,023

(22) Filed: Mar. 11, 2008

(65) Prior Publication Data

US 2009/0150509 A1 Jun. 11, 2009

(30) Foreign Application Priority Data

Dec. 10, 2007 (TW) .............................. 96147070 A

(51) Int. Cl.
 *G06F 13/00* (2006.01)
(52) U.S. Cl. .......................... 709/224; 709/250; 713/320
(58) Field of Classification Search ................. 709/223, 709/224, 250; 713/320, 323, 324
See application file for complete search history.

(56) References Cited

U.S. PATENT DOCUMENTS 6,098,175 A * 8/2000 Lee ............................. 713/320
6,295,002 B1 * 9/2001 Fukuda ..................... 340/636.1
7,474,146 B2 * 1/2009 Wu .............................. 327/544
2005/0289368 A1 * 12/2005 Chang et al. ................. 713/300
2006/0267513 A1 * 11/2006 Morishita .................... 315/247
2007/0053214 A1 * 3/2007 Coorens ....................... 363/49
2007/0285682 A1 * 12/2007 Lutnesky et al. ............. 358/1.8

FOREIGN PATENT DOCUMENTS

| CN | 2427023 Y | 4/2001 |
| CN | 101038492 A | 9/2007 |
| TW | M285825 | 1/2006 |
| TW | M291658 | 6/2006 |

* cited by examiner

*Primary Examiner*—Viet Vu
(74) *Attorney, Agent, or Firm*—WPAT, PC; Justin King

(57) ABSTRACT

A smart client-server power control apparatus is disclosed, which comprises: a micro process unit, for signal and operation control; a communication unit, capable of receiving commands from a user for enabling the user to direct electric products connected to a server jack or/and client jacks of the smart client-server power control apparatus to enter/exit a stand-by mode; a detection unit, capable of detecting the power consumption of a first electric product connected to the server jack while informing the micro process unit to perform a stand-by process as soon as the detected power consumption is lower than a specific rated value; and a control unit, for executing the activating/deactivating of the server jack and client jacks according to signals received from the micro process unit.

13 Claims, 3 Drawing Sheets

| Master electric product status | Slave electric product status | Response of the client jacks |
|---|---|---|
| OFF | - | Deactivation mode |
| ON | OFF | Stand by mode |
| ON | ON | Activation mode |
| ON | ON (within a specific short period of time after the master electric product connected to the server jack is being activated) | (activating the client jacks while enabling the smart client-server socket to issue an alerting signal) |

FIG. 3

SMART CLIENT-SERVER POWER CONTROL APPARATUS

FIELD OF THE INVENTION

The present invention relates to a smart client-server power control apparatus, and more particularly, to an improve power control apparatus capable of freeing a user from turning the power of the power control apparatus on/off repetitively just for lowering the standby power consumed by any ordinary electric products connected thereto in a manner that those standby electric products will no longer consumes any power since the control of such standby function is taken over by the low power consuming power line configuration or wireless communication protocol with sleep mode ability, configured in the power control apparatus.

BACKGROUND OF THE INVENTION

Although there are already many studies about how to reduce the power consumed by a standby electric product, only a number of them focus their effort for achieving intelligent remote standby power control by the use of a means of remote control or wired control. Even for those few studies about intelligent remote standby power control, only the topics relating to the architecture and configuration of the remote control are addressed that there is no systematic research about how to construct the connection between the intelligent remote standby power control and electric products, none will there be any study about how to configure the operation mode for the electric products using the intelligent remote standby power control.

One such study is disclosed in TW Pat. Pub. No. M291658, which is a power line communication system capable of enabling a user to determine whether or not to provide an alternating current to an electric product connected to a power line by the use of a remote control device.

Another such study is disclosed in TW Pat. Pub. No. M285825, which is a power saving socket capable of making an evaluation to determine whether to supply power to a variety of plug-ins by the mechanism configured therein. It is noted that all the currently available products relating to the aforesaid studies are mostly having their client-server configurations for standby mode control to be setup through a multi-socket, in which an electric product connected to the designated master jack of the multi-socket will be identified as the master electric product while the others connecting to slave jacks are identified as client electric products. However, not all the electric products connected to the aforesaid multi-socket are distributed neighboring to each other so that it might not be feasible to connect all the electric products to the same multi-socket.

Therefore, it is in need of an improved socket configuration that not only is freed from those aforesaid shortcomings, but also can lower the standby power consumed by any electric products connected thereto.

SUMMARY OF THE INVENTION

The object of the present invention is to provide a smart client-server power control apparatus capable of freeing a user from turning the power of the power control apparatus on/off repetitively just for lowering the standby power consumed by any ordinary electric products connected thereto.

It is another object of the invention to provide a means capable of utilizing a low power consuming power line configuration or wireless communication protocol with sleep mode ability configured therein to take over standby function control for lowering the power consumed by those standby electric products connected to the means.

To achieve the above objects, the present invention provides a smart client-server power control apparatus, comprising: a micro process unit, for signal and operation control; a communication unit, capable of receiving commands from a user for enabling the user to direct electric products connected to a server jack or/and client jacks of the smart client-server power control apparatus to enter/exit a stand-by mode; a detection unit, capable of detecting the power consumption of a first electric product connected to the server jack while informing the micro process unit to perform a stand-by process as soon as the detected power consumption is lower than a specific rated value; and a control unit, for executing the activating/deactivating of the server jack and client jacks according to signals received from the micro process unit.

Further scope of applicability of the present application will become more apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given herein below and the accompanying drawings which are given by way of illustration only, and thus are not limitative of the present invention and wherein:

FIG. 3 is a table illustrating how the master electric product and the slave electric products are operating in response to each other as they are connected to a same smart client-server power control apparatus of the invention.

DESCRIPTION OF THE EXEMPLARY EMBODIMENTS

For your esteemed members of reviewing committee to further understand and recognize the fulfilled functions and structural characteristics of the invention, several exemplary embodiments cooperating with detailed description are presented as the follows.

Figure 1:
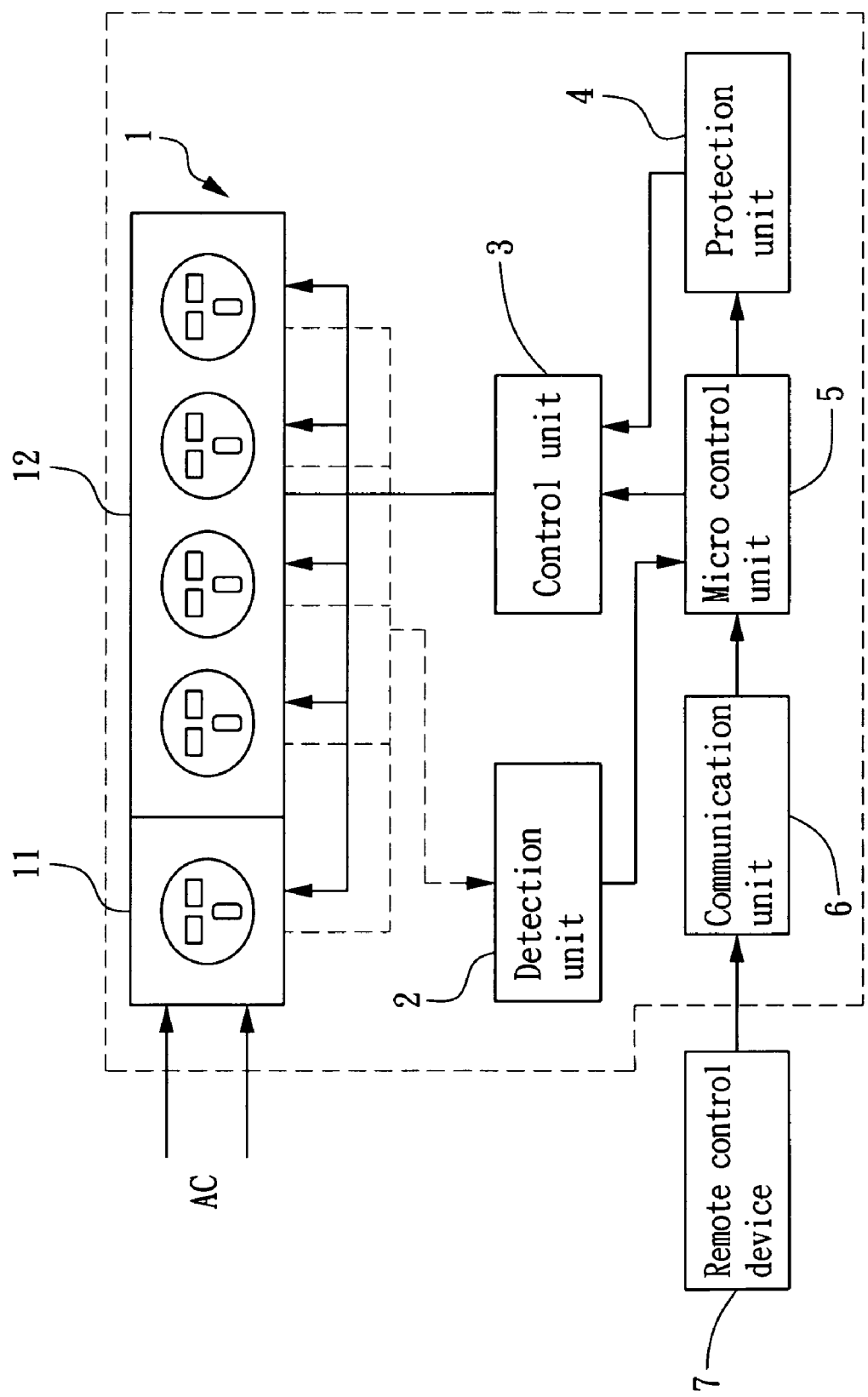
FIG. 1 is a block diagram showing a smart client-server power control apparatus according to an exemplary embodiment of the invention.
Figure 2:
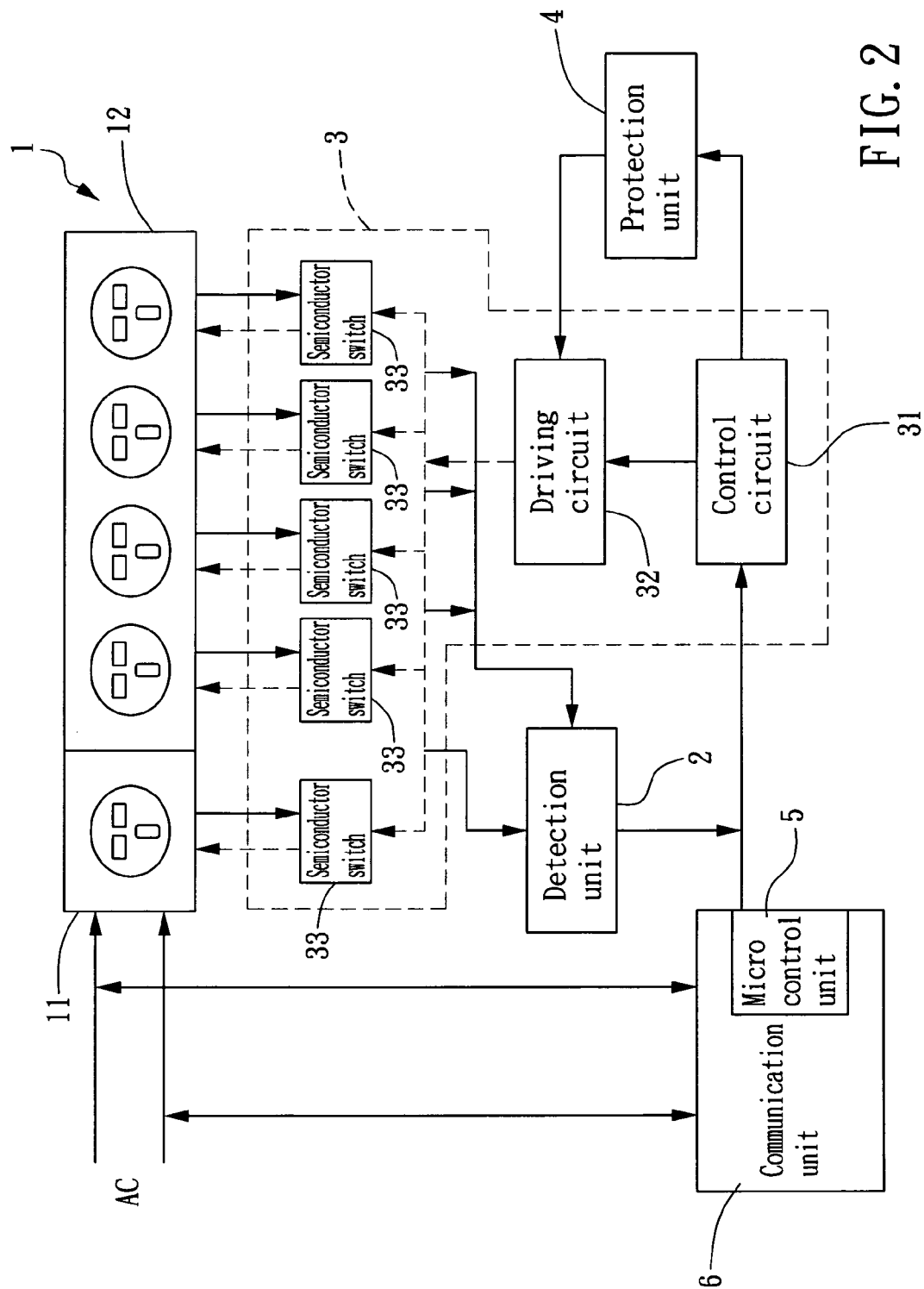
FIG. 2 is a more detailed block diagram of the smart client-server power control apparatus shown in FIG. 1.

Please refer to FIG. 1 and FIG. 2, which show a smart client-server power control apparatus of the invention. In this embodiment, the power control apparatus 1 comprises a server jack 11 and four client jacks 12, in which the server jack 11 as well as each of the four client jacks 12 is connected to a semiconductor switch 33 corresponding thereto. Moreover, the power control apparatus 1 further comprises: a micro process unit 5, for signal and operation control; a communication unit 6, capable of receiving commands from a user through an indoor network for enabling the user to direct electric products connected to the server jack 11 and the four client jacks 12 to enter/exit a stand-by mode; a detection unit 2, capable of detecting the power consumption of electric product connected to the server jack 11 while informing the micro process unit 5 to perform a stand-by process as soon as the detected power consumption is lower than a specific rated value; and a control unit 3, for executing the activating/deactivating of the server jack 11 and client jacks 12 according to signals received from the micro process unit 5. In this embodiment, the communication unit 6, being a ZigBee communication module, is connected to an indoor alternating current (AC) power line for enabling the smart client-server power control apparatus of the invention to equip with a remote monitoring ability. For instance, by the use of the smart client-server power control apparatus 1 of the invention, parents can remotely control and manager the power usage in their children's rooms. In addition, by the use of the communication unit 6, the power control as well as the power consumption management relating to each of the client jacks 12 can be achieved by the smart client-server power control apparatus 1 of the invention.

For clarity, the responsive relation between the server jack 11, the client jacks 12 and the communication unit 5 is further describe in the following:

A. Server jack 11: being configured with an on/off ability relating to the control of power supply to the server jack 11 while enabling the on/off ability to be controlled and managed by a ZigBee communication module or power line module in cooperation with a semiconductor switch corresponding to the server jack 11.

B. Client jack 12: capable of being activate/deactivate in either a complete manner or a periodic manner while enabling each client jack 12 to be turn on/off by the control of a ZigBee communication module or power line module in cooperation with a semiconductor switch corresponding to the client jack 12.

C. Communication unit 6: capable of being activated by a command signal received from a remote control device 7 while enabling the same to monitor and transmit parameters relating to voltage, current, etc in a remote manner through the use of an interface defined by the ZigBee communication protocol, an Bluetooth interface, or a wired power line data transmission module; and moreover, being enabled to perform a remote monitoring or periodical monitoring of power management, such as by the detection and signal transmission of the communication unit 6, parents can remotely control and manager the power usage in their children's rooms.

It is noted that the aforesaid ZigBee communication protocol is used for replacing those wireless control protocol used in most current remote controls. ZigBee is the name of a specification for a suite of high level communication protocols using small, low-power digital radios based on the IEEE 802.15.4 standard for wireless personal area networks (WPANs), such as wireless headphones connecting with cell phones via short-range radio. The technology is intended to be simpler and cheaper than other WPANs, such as Bluetooth. ZigBee is targeted at radio-frequency (RF) applications which require a low data rate, long battery life, and secure networking.

For providing over-current protection to the server and the client jacks 11, 12, an over-current protection mechanism is designed in the smart power control apparatus 1, by which when current in the server or the client jacks 11 is higher than a specific rated value, an alarm will first be issue and the server jack 11 will be deactivated as soon as the duration of the over-current is longer than a specific period of time so that the power usage safety can be ensured.

Please refer to FIG. 3, which is a table illustrating how the master electric product and the slave electric products are operating in response to each other as they are connected to a same smart client-server power control apparatus of the invention. The smart client-server power control apparatus of the invention can be divided into two types, which are the intelligent power control apparatus and smart network power control apparatus, both capable of being adapted for a TV (television) group and a PC (personal computer) group for ensuring power usage safety. Under normal usage, the power consumption of the smart client-server power control apparatus of the invention will not exceed 15A and thus the smart client-server power control apparatus of the invention can be adapted for groups of electric products exemplified in the following:

The general rule adopted by the aforesaid example is that: the electric product of high power consumption is designated to use the server jack while those other electric products of low power consumption in the same group will be designated to use the client jacks. Moreover, the smart client-server power control apparatus of the invention is configured with a basic function mode and a lower-standby-consumption mode, by that a smart client-server power control apparatus operating in the basic function mode is just a conventional power control apparatus while the smart client-server power control apparatus operating in the lower-standby-consumption mode is an improved power control apparatus capable of lowering the standby power consumed by any ordinary electric products connected thereto.

When the smart client-server power control apparatus is operating in the lower-standby-consumption mode and the server jack 11 thereof is off, each client jack 12 can be deactivated by the use of a corresponding switch for subjecting the client jack 12 to a deactivation mode for enabling the power consumed by the electric product connecting to the referring client jack 12 to reduced to zero. In addition, the switch used for deactivating the client jack can be an electronic switch. It is known for fact that the percentage of the slave electric products connecting to the client jacks, such as the DVD player or set-top-box, to remain on while the master electric product, such as TV, connecting to the server jack to be off can be as high as 50%. Therefore, it is preferred to turn those client jacks the same time when the master electric product is turned off so as to save power. On the other hand, when the server jack is activated and the master electric product is on, the client jacks will all be activated and thus the smart power control apparatus is operating in the basic function mode the same as those conventional power control apparatuses.

With reference to FIG. 1 and FIG. 2, it is noted that the operation of the smart client-server power control apparatus of the invention can be categorized into the following four situations:

(1) The situation when the master electric product and the slave electric products are operating at the same time:

It is known from the above description that the smart client-server power control apparatus of the invention is able to use a switch to select an operation mode between the basic function mode and a lower-standby-consumption mode. When the smart client-server power control apparatus is selected to operate under the basic function mode, it is functioning just like any conventional power control apparatus that it is configured for providing power to the master and the slave electric products so as to enable those products to remain on at the same time. For instance, when a use is using the abovementioned TV group for watching videos, the smart client-server power control apparatus should be configured for supplying power to the TV, plugging in the server jack 11, and the DVD player, plugging in one of the client jacks 12, that is, the server jack 11 and at least the specific client jack 12 should be activated.

(2) The situation when the master electric product is being turned off while bringing along the slave electric products to be turned off also:

The smart client-server power control apparatus can be configured in a manner that as soon as the detection unit 2 detects the current of a master electric product connected to the server jack 11 is lower than a specific rated value, the status of the master electric product will be determined to be off and thereafter the detection unit 2 is going to inform the micro process unit 5 with such off signal for directing the same to turn off each and every slave electric product connecting to the client jacks 12 through the control unit 3 in a manner that all the client jacks 12 are being deactivated by the use of semiconductor switches 33 corresponding thereto while the server jack 11 is not operating, i.e. the server jack can be operating under either the deactivation mode or the standby mode, and thereby, the power consumption of those slave electric products will be reduced to almost 0 W. For instance, when a use only turns off the TV and forgets to turn off the DVD player when he/she had finished using the abovementioned TV group for watching videos, the smart client-server power control apparatus detecting the master electric product, i.e. the TV, is off will deactivate its client jacks 12 for turning off the forgotten DVD player.

(3) The situation when the master electric product is being turned on while keeping the slave electric products to be in the standby mode:

The smart client-server power control apparatus can be configured in a manner that as soon as the detection unit 2 detects the current of the master electric product connected to the server jack 11 is higher than the specific rated value, the status of the referring master electric product is determined to be on and thereafter the detection unit 2 is going to inform the micro process unit 5 with such on signal for directing the same to enable each and every client jacks to enter a standby mode through the control unit 3. That is, when the server jack 11 is activating, all the client jacks 12 should enter the standby mode until the slave electric products connected thereto are being turned on and then the client jacks 12 corresponding to the turned-on slave electric products are directed to enter the activation mode. The client jack 12 operating under the standby mode will only periodically provide the corresponding slave electric product with a minimum power just enough for allowing the slave electric product to receive signals, so that when the slave electric product receive a signal indicating that it is being turned on after the master electric product had be turned on for a period of time, the micro process unit 5 will direct the control unit 3 to activate all the client jacks 12. For instance, when a use had done using the TV group for watching video and is still watching TV shows on the TV while forgetting to turn off the DVD player connecting to the client jack 12, the client jack 12 will be directed to enter the standby mode for preparing the DVD player in case of the user is going to watch another video thereafter.

(4) The situation when one of the client jacks is activated within a specific short period of time after the server jack is activated, an alerting signal is issued for warning the user that the referring slave electric product is on prior to the activation of the corresponding client jack:

The smart client-server power control apparatus can be configured in a manner that as soon as the detection unit 2 detects the current of a slave electric product connected to one of the client jack 12 is higher than the specific rated value, the status of the referring slave electric product is determined to be on and the detection unit 2 is going to inform the micro process unit 5 with such on signal for directing the same to enable the client jack 12 to enter an activation mode through the control unit 3; and in a condition that the client jack 12 is activated within a specific short period of time after the server jack 11 is activated, an alerting signal is issued for warning the user that the referring slave electric product has been remained on prior to the activation of the corresponding client jack 12. The alerting signal can be issued by the use of an audio/video device configured in the corresponding client jack 12, and such audio/video device can be a light emitting diode or a beeper. Thus, by the alerting signal, the user is reminded that he/she had forgotten to turn the slave electric product off after its last usage. It is noted that the alerting signal can be stopped by the press of a rest button of the corresponding client jack 12, and then the reset client jack 12 is directed to enter the standby mode. For instance, when a use only turns off the TV and forgets to turn off the DVD player when he/she had finished using the abovementioned TV group for watching videos, the client jack 12 connected to the DVD player will issue the alerting signal as soon as the TV is being turned on again.

From the description relating to FIG. 1 to FIG. 3, it is clear that the object of the present invention is to provide a smart client-server power control apparatus capable of freeing a user from turning the power of the power control apparatus on/off repetitively just for lowering the standby power consumed by any ordinary electric products connected thereto in a manner that those standby electric products will no longer consumes any power since the control of such standby function is taken over by the low power consuming power line configuration or wireless communication protocol with sleep mode ability, configured in the power control apparatus.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A smart client-server power control apparatus, comprising:
   a micro process unit, for signal and operation control;
   a communication unit, capable of receiving commands from a user for enabling the user to direct electric products connected to a server jack or/and client jacks of the smart client-server power control apparatus to enter/exit a stand-by mode;
   a detection unit, capable of detecting the power consumption of a first electric product connected to the server jack while informing the micro process unit to perform a stand-by process as soon as the detected power consumption is lower than a specific rated value; and
   a control unit, for executing the activating/deactivating of the server jack and client jacks according to signals received from the micro process unit;
   wherein as soon as the detection unit detects the current of the first electric product connected to the server jack is lower than the specific rated value, the status of the first electric product is determined to be off and the detection unit is enabled to inform the micro process unit with such off signal for directing the same to turn off a second electric product connecting to the client jacks through the control unit in a manner that all the client jacks are being deactivated by the use of semiconductor switches corresponding thereto while the server jack is not operating.

2. The smart client-server power control apparatus of claim 1, further comprising a protection unit.

3. The smart client-server power control apparatus of claim 1, wherein the protection unit is an electronic switch.

4. The smart client-server power control apparatus of claim 1, wherein the control unit further comprises:
- a plurality of semiconductor switches, for controlling the activation/deactivation of the client jacks;
- a driving circuit, for driving the plural semiconductor switches to operate; and
- a control circuit, for transmitting an on/off command to the driving circuit to be executed thereby.

5. The smart client-server power control apparatus of claim 4, further comprising:
- a protection unit, being arranged at a position sandwiched between the control circuit and the driving circuit.

6. The smart client-server power control apparatus of claim 5, wherein the protection unit is an electronic switch.

7. The smart client-server power control apparatus of claim 1, wherein the communication unit is capable of being directed to operate by a command signal received from a remote control device.

8. The smart client-server power control apparatus of claim 7, wherein the wireless interface used in the remote control device is defined by a ZigBee communication protocol.

9. The smart client-server power control apparatus of claim 7, wherein the wireless interface used in the remote control device is a Bluetooth interface.

10. The smart client-server power control apparatus of claim 1, wherein the communication unit is capable of being directed to operate by a command signal received from a power line.

11. A smart client-server power control apparatus, comprising:
- a micro process unit, for signal and operation control;
- a communication unit, capable of receiving commands from a user for enabling the user to direct electric products connected to a server jack or/and client jacks of the smart client-server power control apparatus to enter/exit a stand-by mode;
- a detection unit, capable of detecting the power consumption of a first electric product connected to the server jack while informing the micro process unit to perform a stand-by process as soon as the detected power consumption is lower than a specific rated value; and
- a control unit, for executing the activating/deactivating of the server jack and client jacks according to signals received from the micro process unit;
- wherein as soon as the detection unit detects the current of a second electric product connected to one of the client jacks is lower than the specific rated value, the status of the second electric product is determined to be off and the detection unit is enabled to inform the micro process unit with such off signal for directing the same to enable the client jack to enter a standby mode through the control unit while only providing power to such client jacks in a periodic manner for allowing the same to receive signals.

12. A smart client-server power control apparatus, comprising:
- a micro process unit, for signal and operation control;
- a communication unit, capable of receiving commands from a user for enabling the user to direct electric products connected to a server jack or/and client jacks of the smart client-server power control apparatus to enter/exit a stand-by mode;
- a detection unit, capable of detecting the power consumption of a first electric product connected to the server jack while informing the micro process unit to perform a stand-by process as soon as the detected power consumption is lower than a specific rated value; and
- a control unit, for executing the activating/deactivating of the server jack and client jacks according to signals received from the micro process unit;
- wherein as soon as the detection unit detects the current of the first electric product connected to the server jack is higher than the specific rated value, the status of the first electric product is determined to be on and the detection unit is enabled to inform the micro process unit with such on signal for directing the same to enable the client jacks to enter a standby mode through the control unit.

13. A smart client-server power control apparatus, comprising:
- a micro process unit, for signal and operation control;
- a communication unit, capable of receiving commands from a user for enabling the user to direct electric products connected to a server jack or/and client jacks of the smart client-server power control apparatus to enter/exit a stand-by mode;
- a detection unit, capable of detecting the power consumption of a first electric product connected to the server jack while informing the micro process unit to perform a stand-by process as soon as the detected power consumption is lower than a specific rated value; and
- a control unit, for executing the activating/deactivating of the server jack and client jacks according to signals received from the micro process unit;
- wherein as soon as the detection unit detects the current of a second electric product connected to one of the client jacks is higher than the specific rated value, the status of the second electric product is determined to be on and the detection unit is enabled to inform the micro process unit with such on signal for directing the same to enable the client jack to enter an activation mode through the control unit; and in a condition that the client jack is activated within a specific short period of time after the server jack is activated, an alerting signal is issued for warning the user that the second electric product is on prior to the activation of the corresponding client jack.

* * * * *